(12) United States Patent
Shao

(10) Patent No.: US 10,789,000 B2
(45) Date of Patent: Sep. 29, 2020

(54) VARIABLE ELECTRONIC APPARATUS

(71) Applicant: AEWN TECHNOLOGIES CO., LTD., New Taipei (TW)

(72) Inventor: Ming-Lun Shao, New Taipei (TW)

(73) Assignee: AEWN TECHNOLOGIES CO., LTD., New Taipei (TW)

(*) Notice: Subject to any disclaimer, the term of this patent is extended or adjusted under 35 U.S.C. 154(b) by 38 days.

(21) Appl. No.: 16/250,288

(22) Filed: Jan. 17, 2019

(65) Prior Publication Data

US 2020/0073570 A1 Mar. 5, 2020

(30) Foreign Application Priority Data

Aug. 28, 2018 (TW) .............................. 107129957 A

(51) Int. Cl.
*G06F 3/06* (2006.01)
*H04L 12/24* (2006.01)
(Continued)

(52) U.S. Cl.
CPC .......... *G06F 3/0634* (2013.01); *G06F 3/0604* (2013.01); *G06F 3/0673* (2013.01); *G06F 13/1668* (2013.01); *G06F 13/4282* (2013.01); *H04L 41/08* (2013.01); *G06F 2213/0016* (2013.01); *G06F 2213/0026* (2013.01);
(Continued)

(58) Field of Classification Search
CPC .... G06F 3/0634; G06F 3/0604; G06F 3/0673; G06F 13/4282; G06F 13/1668; G06F 2213/0042; G06F 2213/0016; G06F 2213/0034; G06F 2213/0026; H04L 41/08
See application file for complete search history.

(56) References Cited

U.S. PATENT DOCUMENTS

| 5,692,147 A * | 11/1997 | Larsen ............. H03K 19/17704 326/39 |
| 2010/0066408 A1* | 3/2010 | Kyouno ........... H03K 19/17748 326/38 |
| 2017/0154001 A1 | 6/2017 | Filser et al. |

FOREIGN PATENT DOCUMENTS

| TW | I559155 B | 11/2016 |
| TW | 201805822 A | 2/2018 |
| TW | I613547 B | 2/2018 |

OTHER PUBLICATIONS

Taiwanese Office Action issued in Taiwanese Application No. 107129957 dated Nov. 27, 2019.

* cited by examiner

*Primary Examiner* — Daniel D Chang
(74) *Attorney, Agent, or Firm* — Heslin Rothenberg Farley and Mesiti PC; Nicholas Mesiti

(57) ABSTRACT

Provided is a variable electronic apparatus including a memory unit, a processing unit and a programmable logic gate device. The memory unit stores configuration data. The processing unit reads the configuration data from the memory unit and determines at least one control mode based on the configuration data. The programmable logic gate device includes a plurality of function modules and at least one switching unit. When the control mode includes a function module selecting mode and a signal line switching mode, the processing unit selects or activates the function modules of the programmable logic gate device based on the function module selecting mode, and the switching unit of the programmable logic gate device dynamically modifies or adaptably adjusts a bus of the function module selected by the processing unit and a corresponding external signal line based on the signal line switching mode.

11 Claims, 8 Drawing Sheets

(51) Int. Cl.
 *G06F 13/42* (2006.01)
 *G06F 13/16* (2006.01)
(52) U.S. Cl.
 CPC ............... *G06F 2213/0034* (2013.01); *G06F 2213/0042* (2013.01)

VARIABLE ELECTRONIC APPARATUS

CROSS REFERENCE TO RELATED APPLICATIONS

The present application claims priority to Taiwan Patent Application No. 107129957 filed on Aug. 28, 2018 and entitled "VARIABLE ELECTRONIC APPARATUS", the disclosure of which is incorporated herein by reference in its entirety.

TECHNICAL FIELD

The present disclosure relates to variable electronic apparatuses, and, more particularly, to a variable electronic apparatus with a programmable logic gate device.

DESCRIPTION OF RELATED ART

External trusted apparatuses or electronic apparatuses currently available on the market are typically designed to work with their own dedicated hardware interfaces. However, if a new trusted requirement emerges, the original external trusted apparatus or electronic apparatus has to be replaced; sometimes, even the whole system associated with the external trusted apparatus or electronic apparatus will need to be revamped or replaced. This can be both time consuming and expensive.

Therefore, there is a need for a solution that addresses the aforementioned shortcomings in the prior art.

SUMMARY

A variable electronic apparatus is provided by the present disclosure, which may include a programmable logic gate device for dynamically modifying or adaptably adjusting the buses of function modules and corresponding external signal lines. The function modules or function module groups can be further selected, replaced, deleted or expanded, thereby eliminating the shortcomings of the prior art.

The variable electronic apparatus in accordance with the present disclosure may include: a memory unit for storing a configuration data; a processing unit for reading the configuration data from the memory unit and determining at least one control mode based on the configuration data; and a programmable logic gate device including a plurality of function modules and at least one switching unit, wherein when the control mode includes a function module selecting mode and a signal line switching mode, the processing unit selects or activates at least one of the function modules of the programmable logic gate device based on the function module selecting mode, and the switching unit of the programmable logic gate device dynamically modifies or adaptably adjusts a bus of the function module selected by the processing unit and an external signal line corresponding to the function module selected by the processing unit based on the signal line switching mode.

The present disclosure will become more apparent from the following detailed description taken in conjunction with the accompanying drawings. Additional features and advantages of the present disclosure will be set forth in part in the description which follows, or may be learned by practice of the disclosure. The present disclosure is recognized and attained by means of elements and combinations thereof specified in the appended claims. It should be understood that both the foregoing general description and the following detailed description are exemplary and explanatory only and are not intended to limit the scope of the disclosure as claimed.

DETAILED DESCRIPTION OF THE EMBODIMENTS

Aspects of the present disclosure are described in the following specific embodiments. The advantages and effects of the present disclosure can be readily understood by one of ordinary skill in the art upon reading the disclosure of this specification. The present disclosure may also be practiced or applied using other different embodiments.

Figure 1:
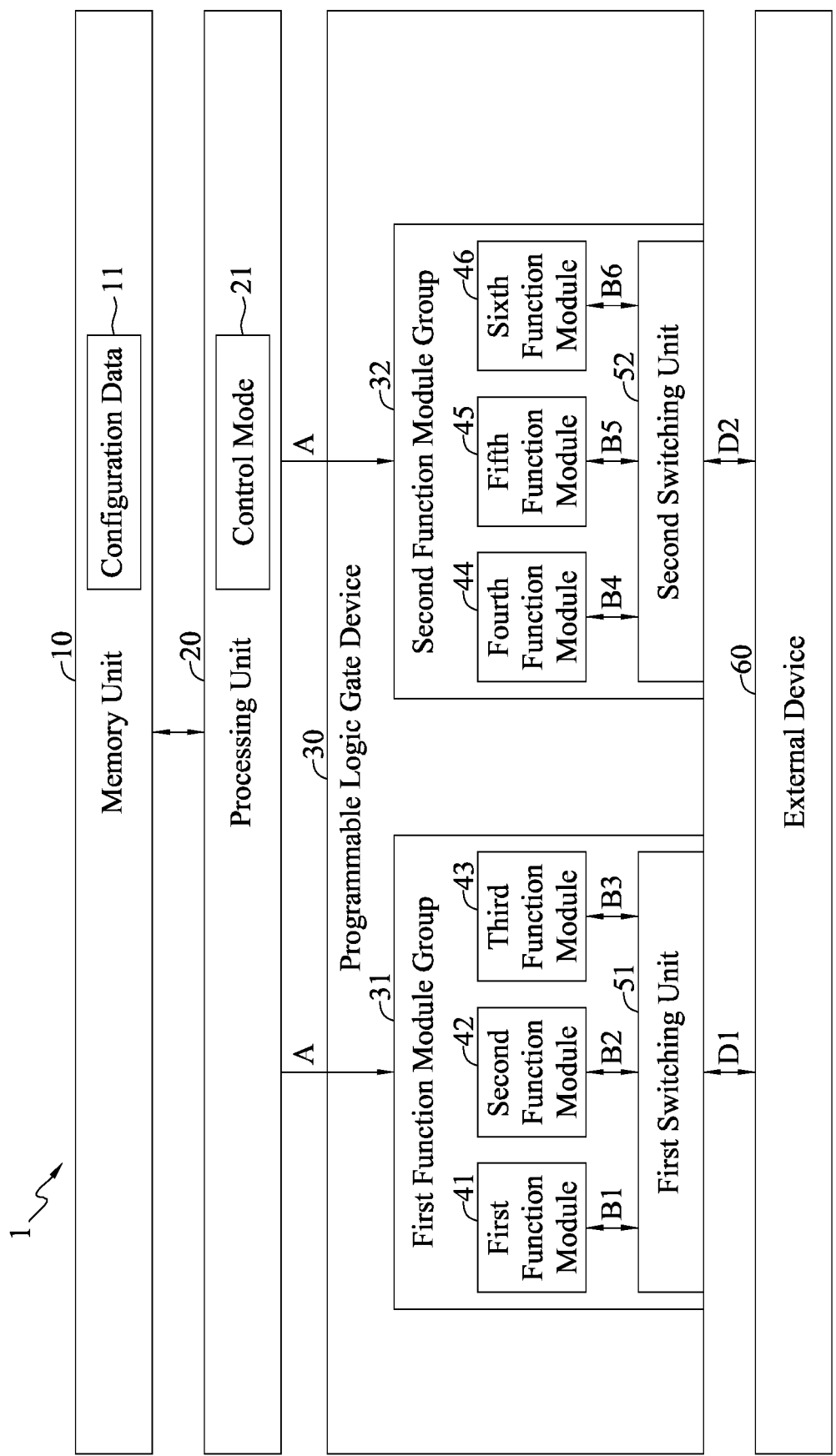
FIG. 1 is a schematic diagram depicting a variable electronic apparatus in accordance with a first embodiment of the present disclosure.

FIG. 1 is a schematic diagram depicting a variable electronic apparatus 1 in accordance with a first embodiment of the present disclosure. The variable electronic apparatus 1 includes a memory unit 10, a processing unit 20 and a programmable logic gate device 30.

In an embodiment, the variable electronic apparatus 1 is a trusted apparatus. In another embodiment, the memory unit 10 is a flash memory, a read-only memory (ROM), a random access memory (RAM), a hard disk (e.g., cloud- or network-based hard drive), an optical disc, a floppy disk, a flash drive, a memory card, or the like. In yet another embodiment, the processing unit 20 is a central processing unit (CPU), a microcontroller unit (MCU), an advanced RISC machine (ARM), etc. In still another embodiment, the programmable logic gate device 30 is a field-programmable gate array (FPGA), a complex programmable logic device (CPLD), a programmable logic device (PLD), a generic array logic (GAL), etc. The present disclosure is not limited to those above.

The memory unit 10 is capable of storing large amounts of different configuration data 11 (configuration values or firmware data). The configuration data 11 includes a variety of different control modes, including 1) a function module selecting mode; 2) a signal line switching mode; 3) a function module replacement module; 4) a function module deletion mode; 5) a function module expansion mode; 6) a function module group expansion mode, etc. The processing unit 20 can read the configuration data 11 from the memory unit 10 and determines at least one control mode based on the configuration data 11. The programmable logic gate device 30 may include a plurality of (e.g., at least two)

function modules and at least one switching unit, and a function module group is composed of at least one function module and at least one switching unit of the programmable logic gate device 30.

In an embodiment, the programmable logic gate device 30 includes a first function module group 31 consists of a first function module 41, a second function module 42, a third function module 43 and a first switching unit 51, and a second function module group 32 consists of a fourth function module 44, a fifth function module 45, a sixth function module 46 and a second switching unit 52.

In an embodiment, the control mode 21 includes the function module selecting mode and the signal line switching mode. Based on the function module selecting mode, the processing unit 20 may select and/or activate at least one of the function modules of the programmable logic gate device 30 via a bus A. Based on the signal line switching mode, the switching unit of the programmable logic gate device 30 may arbitrarily switch between, dynamically modify or adaptably adjust the bus of the function module selected by the processing unit 20 and a corresponding (correspondingly connected) external signal line. The external signal lines can be connected to an external device 60, such as an electronic component, an active component, a passive component, a memory (e.g., a ROM), a printed circuit board (PCB), etc.

In an embodiment, the control mode 21 includes both the function module selecting mode and the signal line switching mode, the processing unit 20 selects at least one of the first function module 41 to the sixth function module 46 of the programmable logic gate device 30 via the bus A based on the function module selecting mode. Based on the signal line switching mode, the first switching unit 51 of the programmable logic gate device 30 can arbitrarily switch between, dynamically modify or adaptably adjust a bus B1 of the first function module 41, a bus B2 of the second function module 42, or a bus B3 of the third function module 43 in the first function module group 31 selected by the processing unit 20 and a corresponding (correspondingly connected) external signal line D1. Based on the signal line switching mode, the second switching unit 52 of the programmable logic gate device 30 can arbitrarily switch between, dynamically modify or adaptably adjust a bus B4 of the fourth function module 44, a bus B5 of the fifth function module 45, or a bus B6 of the sixth function module 46 in the second function module group 32 selected by the processing unit 20 and a corresponding (correspondingly connected) external signal line D2. The external signal line D1 and the external signal line D2 can be both connected to the external device 60.

Each of the first function module 41 to the sixth function module 46 above can be a module of an inter-integrated circuit (I2C), a serial peripheral interface (SPI), an enhanced serial peripheral interface (eSPI), a low pin count (LPC) bus, a system management bus (SMBus), a peripheral component interconnect express (PCI-e) bus, a universal asynchronous receiver/transmitter (UART), a controller area network (CANbus), an advanced extensible interface (AXI), an advanced peripheral bus (APB), an advanced high-performance bus (AHB), or a universal serial bus (USB); however, the present disclosure is not limited to these.

In an embodiment, when the configuration data 11 stored in the memory unit 10 is updated, the processing unit 20 can read the updated configuration data 11 from the memory unit 10 to provide up-to-date control modes.

FIGS. 2A to 2D are schematic diagrams depicting the variable electronic apparatus 1 in accordance with a second embodiment of the present disclosure, wherein the control mode 21 is the signal line switching mode. The main technical features of FIGS. 2A to 2D are described below, while the remaining features thereof are the same as those described with reference to FIG. 1 above.

Figure 2A:
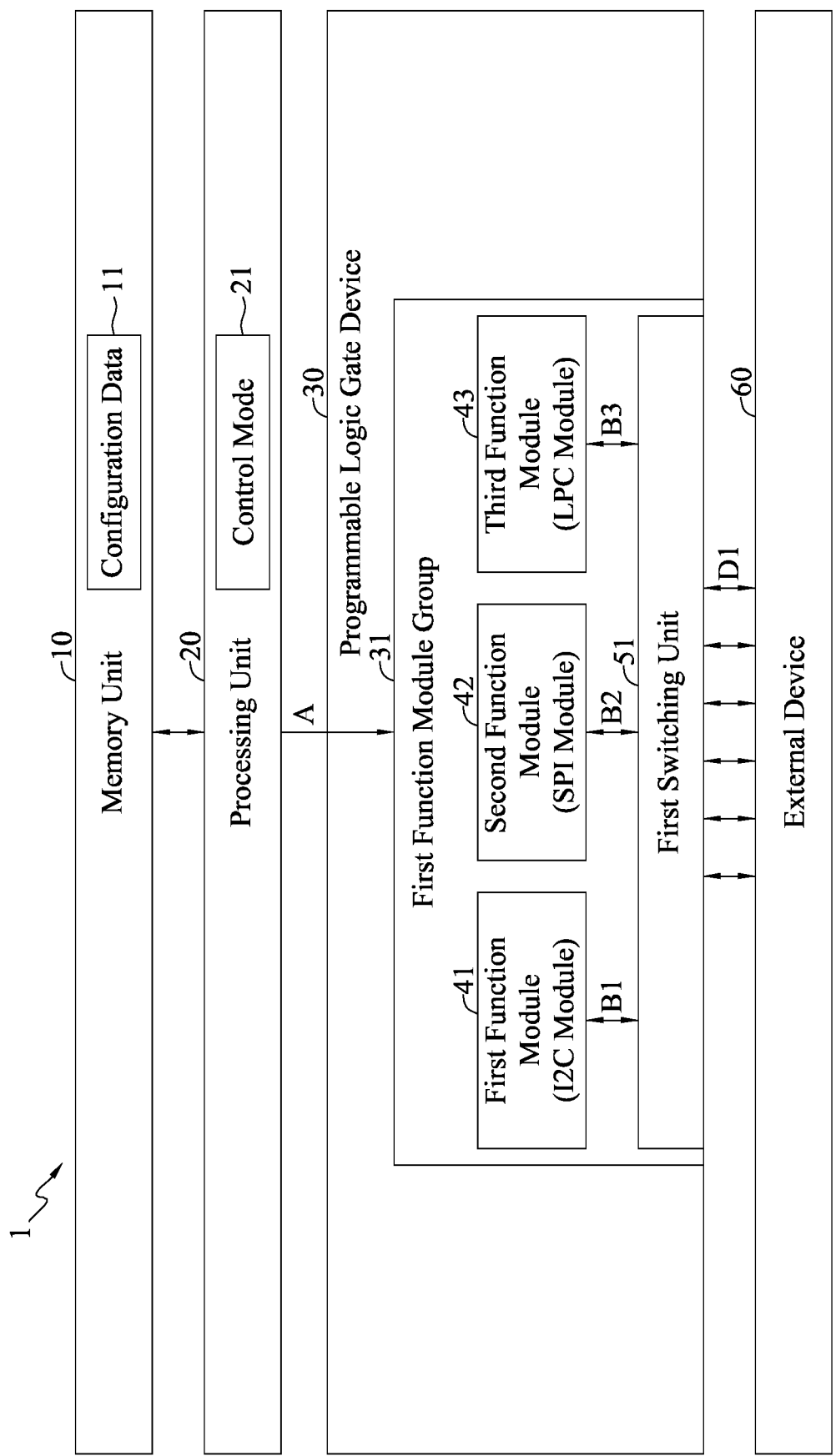
FIGS. 2A to 2D are schematic diagrams depicting a variable electronic apparatus in accordance with a second embodiment of the present disclosure, wherein the control mode is a signal line switching mode.

As shown in FIG. 2A, the processing unit 20 can read the configuration data 11 from the memory unit 10 and determines at least one control mode (e.g., the function module selecting mode and the signal line switching mode) based on the configuration data 11. In an embodiment, the first function module 41, the second function module 42 and the third function module 43 are low-speed buses, such as an I2C module, a SPI module, and a LPC module, respectively. However, the present disclosure is not limited as such.

Figure 2B:
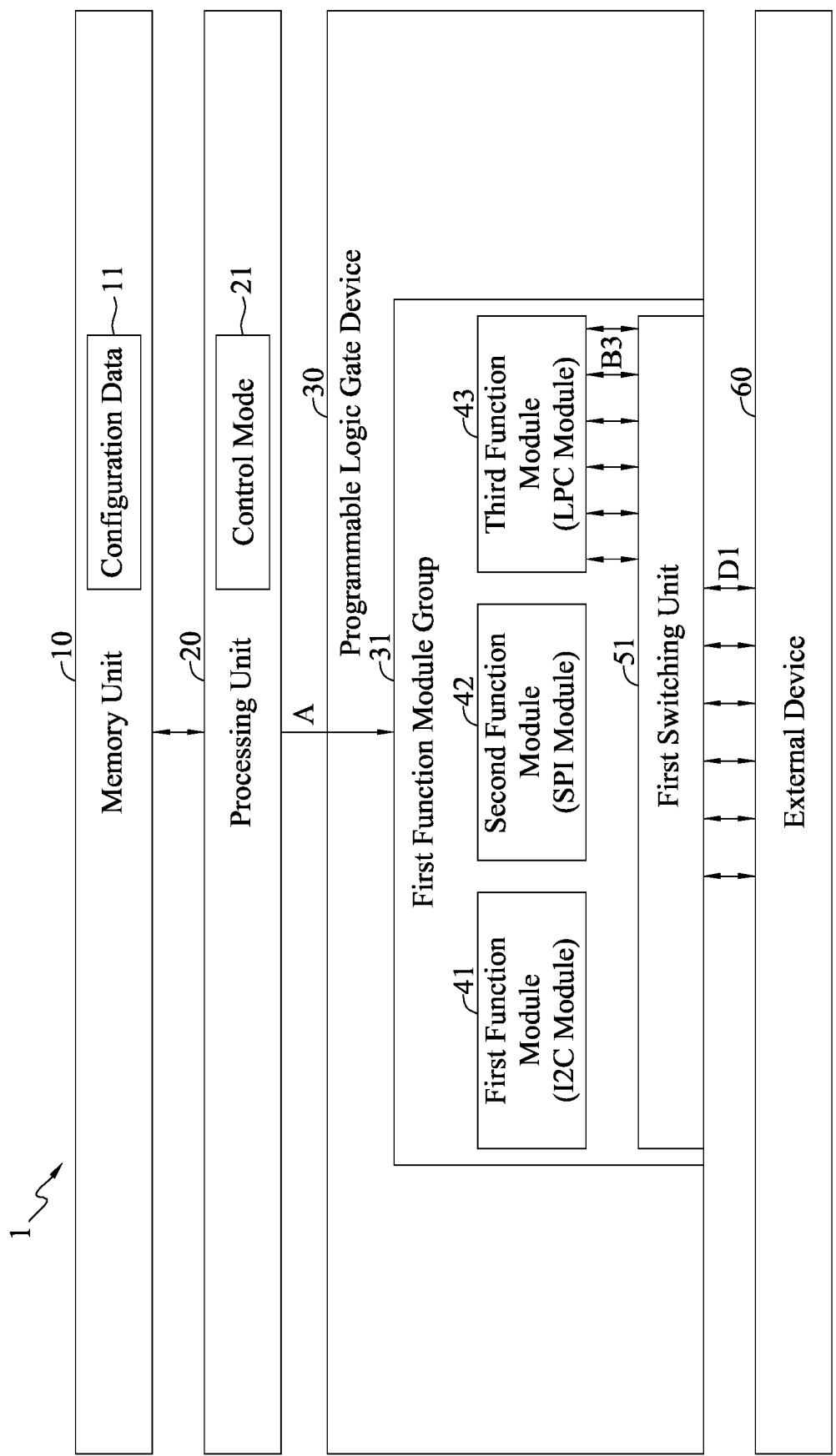
Figure 2C:
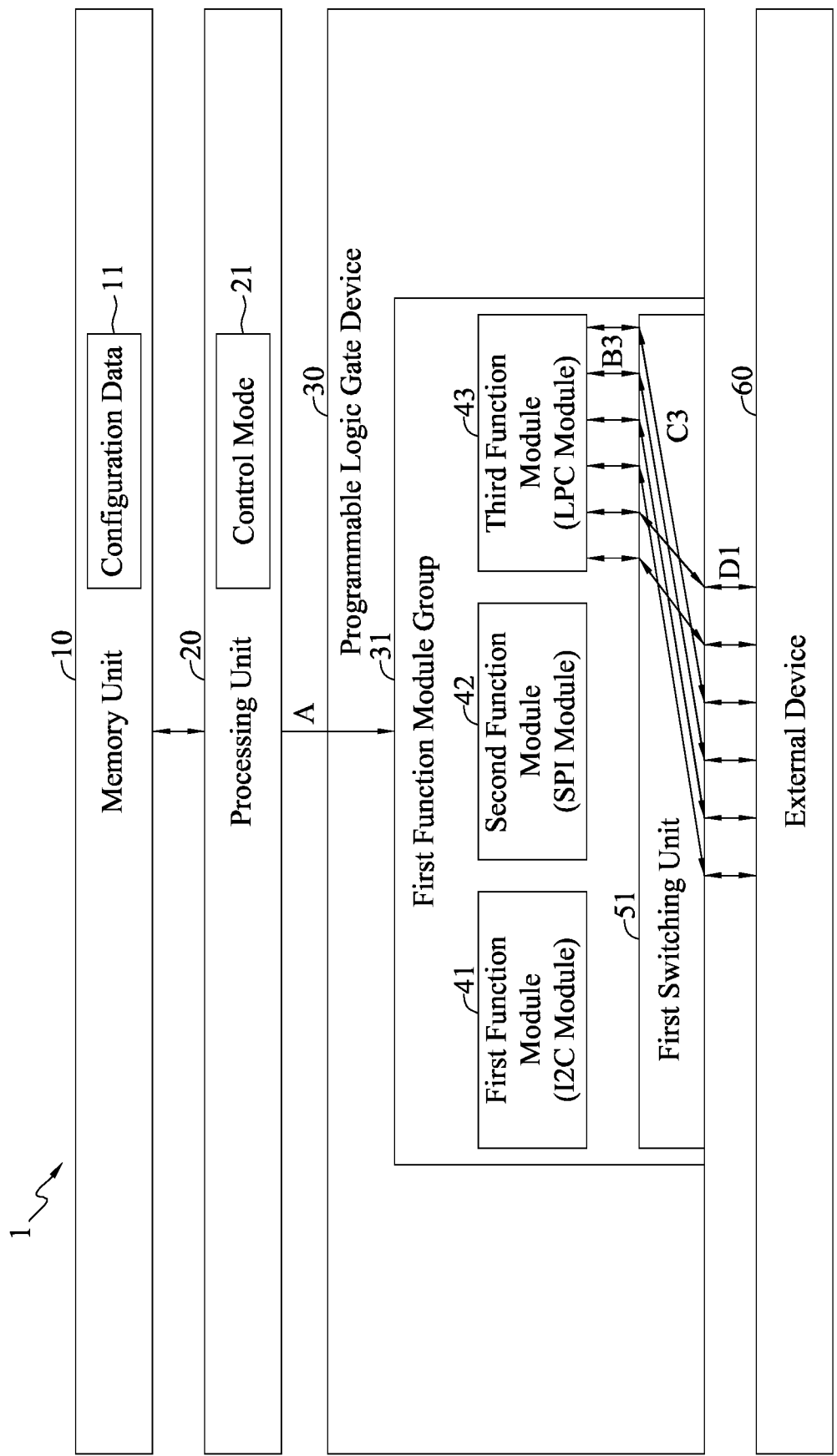

As shown in FIGS. 2B to 2C, assuming the processing unit 20 selected and/or activated the third function module 43 (e.g., an LPC module) in the first function module group 31 of the programmable logic gate device 30 based on a function module selecting mode, the first switching unit 51 of the programmable logic gate device 30 can then, based on a signal line switching mode, arbitrarily switch between, dynamically modify or adaptably adjust buses B3 of the third function module 43 (e.g., an LPC module) selected by the processing unit 20, arbitrary pins of a corresponding (correspondingly connected) signal line C3, and arbitrary pins of a corresponding (correspondingly connected) external signal line D1. The external signal line D1 can be connected to the external device 60.

Figure 2D:
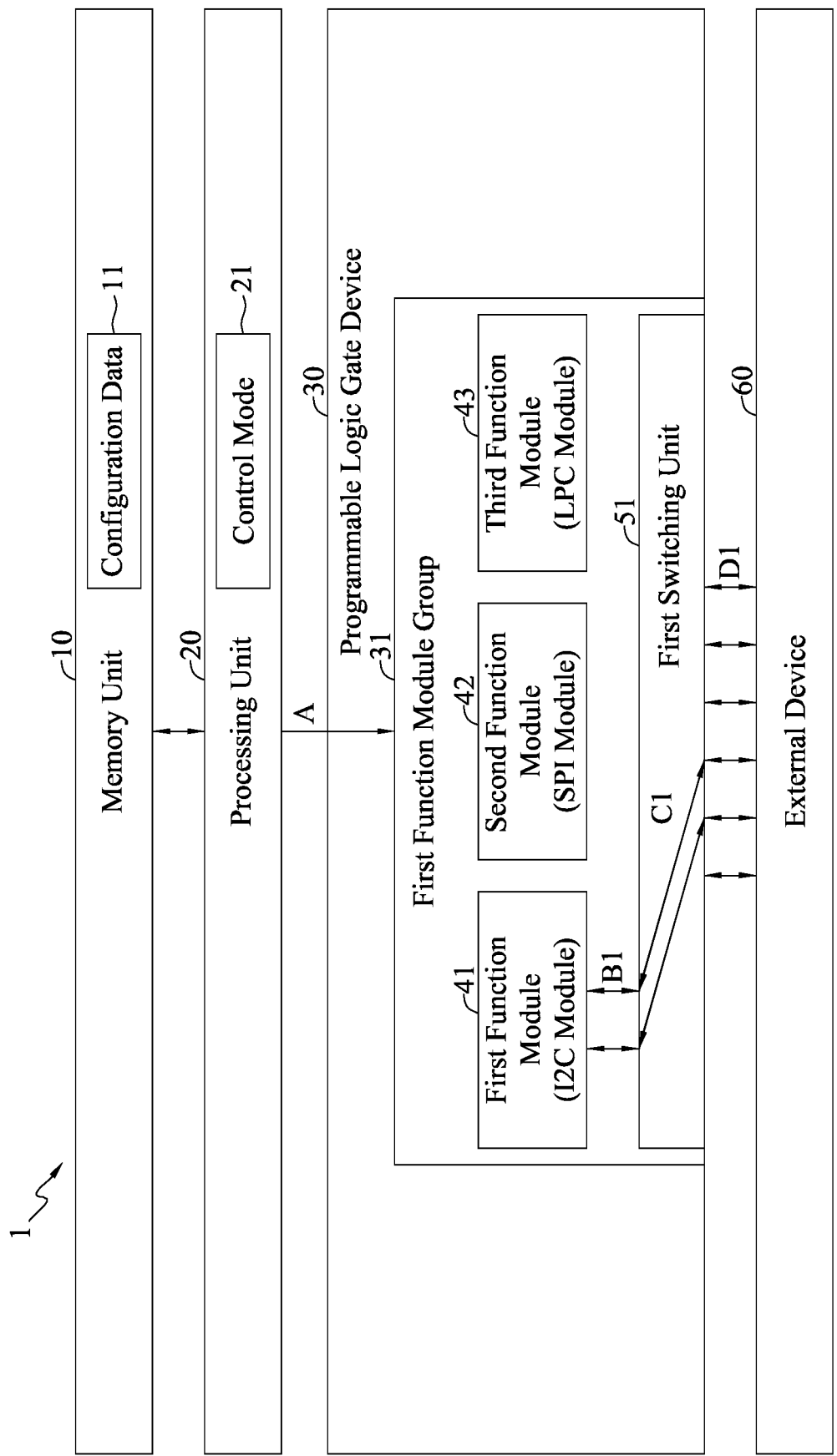

Similarly, as shown in FIG. 2D, assuming the processing unit 20 selected and/or activated the first function module 41 (e.g., an I2C module) in the first function module group 31 of the programmable logic gate device 30 based on another function module selecting mode, the first switching unit 51 of the programmable logic gate device 30 can then, based on another signal line switching mode, arbitrarily switch between, dynamically modify or adaptably adjust buses B1 of the first function module 41 (e.g., an I2C module) selected by the processing unit 20, arbitrary pins of a corresponding (correspondingly connected) signal line C1, and arbitrary pins of the corresponding (correspondingly connected) external signal line D1 (instead of being limited to a fixed pin of the external signal line D1). The external signal line D1 can be connected to the external device 60.

Figure 3:
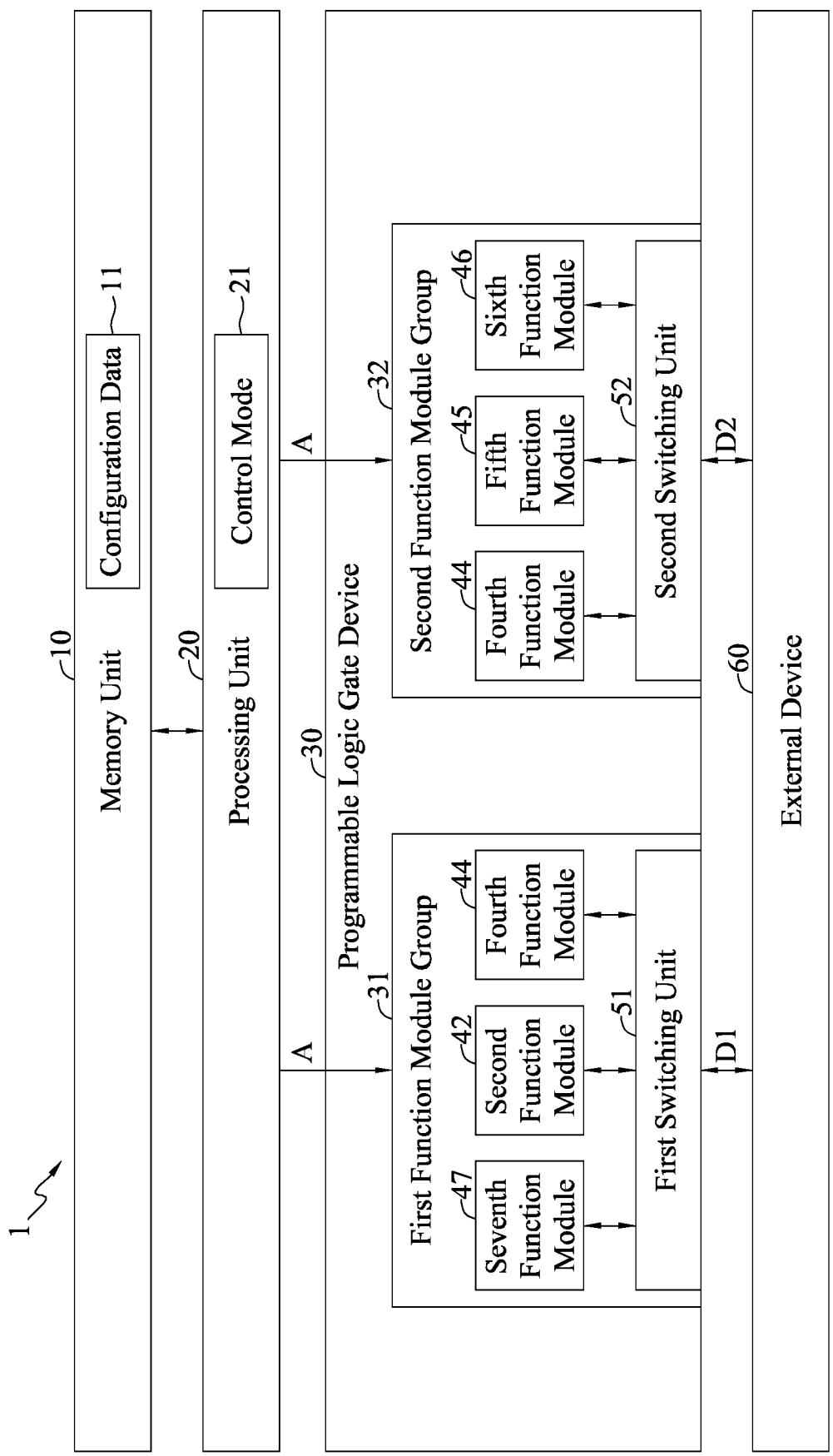
FIG. 3 is a schematic diagram depicting a variable electronic apparatus in accordance with a third embodiment of the present disclosure, wherein the control mode is a function module replacement mode or a function module deletion mode.

FIG. 3 is a schematic diagram depicting the variable electronic apparatus 1 in accordance with a third embodiment of the present disclosure, wherein the control mode 21 is the function module replacement mode or the function module deletion mode. The main technical features of FIG. 3 are described below, while the remaining features thereof are the same as those described with reference to FIG. 1 above.

When the control mode 21 is the function module replacement mode, the processing unit 20 replaces the at least one of the existing function modules with a new function module established by the configuration data 11 (e.g., firmware data) or replaces the at least one of the existing function modules with another one of the existing function modules based on the function module replacement mode.

In an embodiment, the control mode 21 is the function module replacement mode, the processing unit 20 replaces the first function module 41 in the first function module group 31 of FIG. 1 with a seventh function module 47 (new function module) established by the configuration data 11 (e.g., firmware data) and replaces the third function module 43 in the first function module group 31 of FIG. 1 with the fourth function module 44 in the second function module group 32 based on the function module replacement mode. As a result, two new function modules, namely, the seventh function module 47 and the fourth function module 44, are added to the first function module group 31.

When the control mode 21 is the function module deletion mode, the processing unit 20 deletes at least one of the existing function modules based on the function module deletion mode. In and embodiment, deleting the first function module 41 in the first function module group 31, so that the first function module group 31 has one less function (of the first function module 41).

Figure 4:
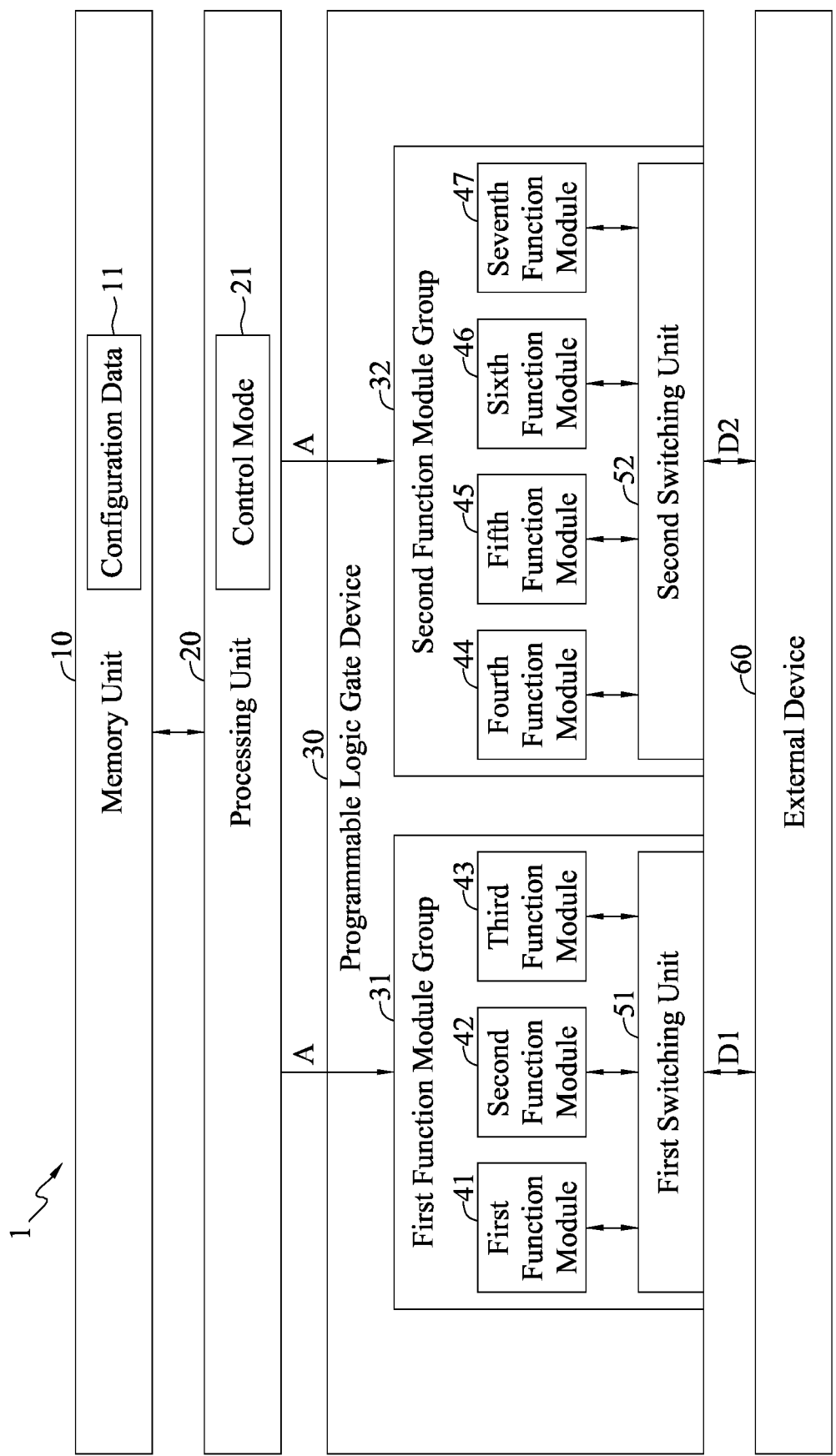
FIG. 4 is a schematic diagram depicting a variable electronic apparatus in accordance with a fourth embodiment of the present disclosure, wherein the control mode is a function module expansion mode.

FIG. 4 is a schematic diagram depicting the variable electronic apparatus 1 in accordance with a fourth embodiment of the present disclosure, wherein the control mode 21 is the function module expansion mode. The main technical features of FIG. 4 are described below, while the remaining features thereof are the same as those described with reference to FIG. 1 above.

When the control mode 21 is the function module expansion mode, the processing unit 20 adds at least one new function module established by the configuration data 11 (e.g., firmware data) to the programmable logic gate device 30 based on the function module expansion mode, so as to expand the number of function modules in the programmable logic gate device 30, adding the function of a new function module to the programmable logic gate device 30.

In an embodiment, the control mode 21 is the function module expansion mode, the processing unit 20 adds a seventh function module 47 (a new function module) established by the configuration data 11 (e.g., firmware data) to the second function module group 32 of the programmable logic gate device 30 based on the function module expansion mode, so as to expand the number of function modules in the second function module group 32, adding the function of a new function module (of the seventh function module 47) to the second function module group 32.

Figure 5:
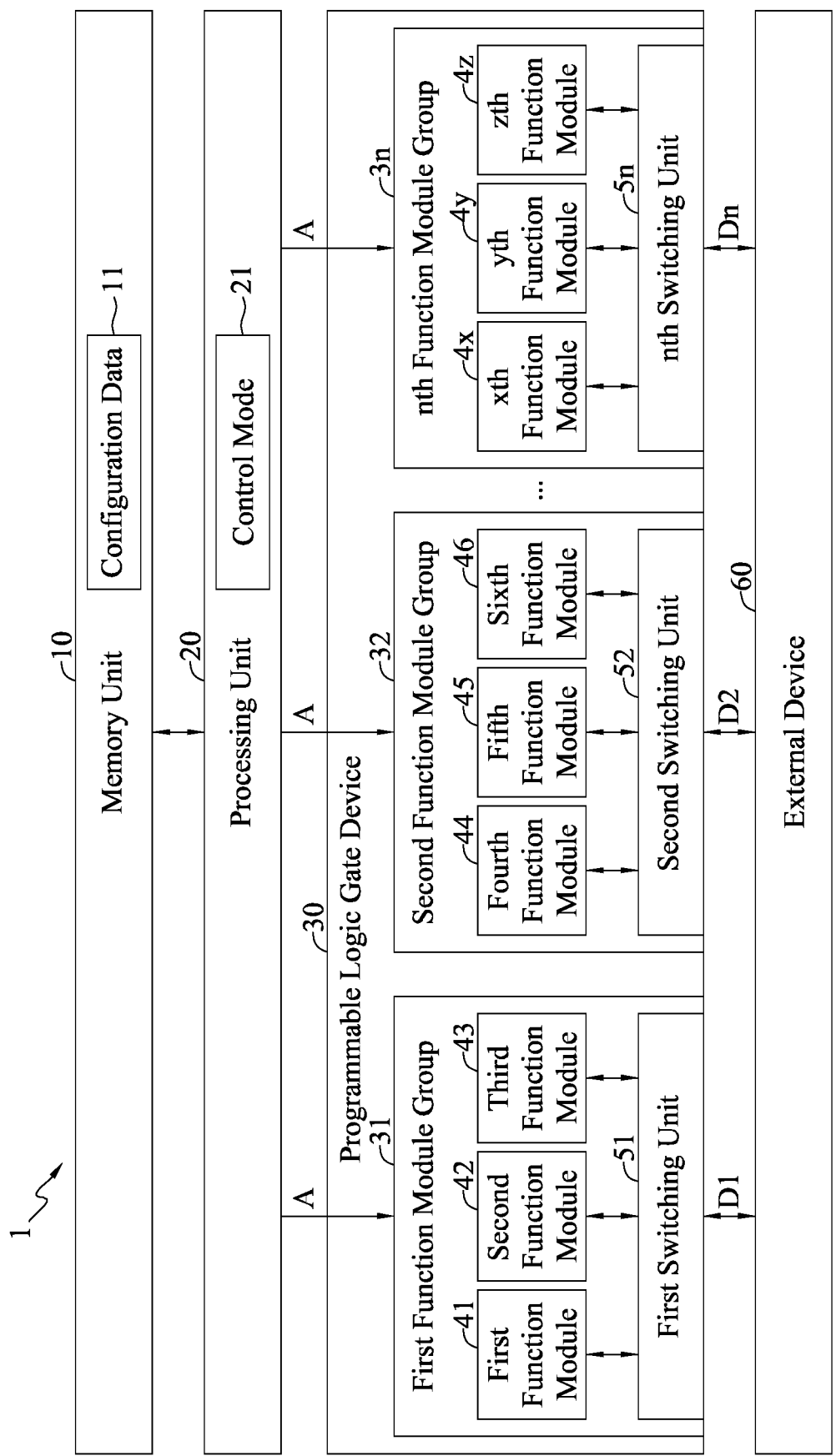
FIG. 5 is a schematic diagram depicting a variable electronic apparatus in accordance with a fifth embodiment of the present disclosure, wherein the control mode is a function module group expansion mode.

FIG. 5 is a schematic diagram depicting the variable electronic apparatus 1 in accordance with a fifth embodiment of the present disclosure, wherein the control mode 21 is the function module group expansion mode. The main technical features of FIG. 5 are described below, while the remaining features thereof are the same as those described with reference to FIG. 1 above.

When the control mode 21 is the function module group expansion mode, the processing unit 20 adds at least one new function module group established by the configuration data 11 (e.g., firmware data) to the programmable logic gate device 30 based on the function module group expansion mode, so as to expand the number of function module groups in the programmable logic gate device 30, adding the functions of a new function module group to the programmable logic gate device 30.

In an embodiment, the control mode 21 is the function module group expansion mode, the processing unit 20 adds a third function module group to nth function module group $3n$ (new function module groups) established by the configuration data 11 (e.g., firmware data) to the programmable logic gate device 30 based on the function module group expansion mode, so as to expand the number of function module groups in the programmable logic gate device 30, adding the functions of the new function module groups to the programmable logic gate device 30.

Each of the third function module group to the nth function module group $3n$ includes at least one function module and a switching unit. The switching unit can be connected to an external device 60 via an external signal line. For example, the nth function module group $3n$ includes an xth function module $4x$, a yth function module 47, a zth function module $4z$, and an nth switching unit $5n$, and the nth switching unit $5n$ is connected to the external device 60 via an external signal line Dn.

It should be noted that the different embodiments of the variable electronic apparatuses according to the present disclosure can be used in conjunction with one and another, and the present disclosure is not limited to a specific embodiment. In an embodiment, the control mode can include the function module group expansion mode, the function module selecting mode, and the signal line switching mode, so that the processing unit performs expansion of the function module groups, selecting of the function modules, and switching of the signal lines with respect to the programmable logic gate device based on the above control modes.

As can be understood from the above, the variable electronic apparatus according to the present disclosure includes at least the following features, advantages or technical effects:

1. Reduced time and cost spent to accommodate a new trusted requirement by a variable update characteristic of the programmable logic gate device as well as a system design architecture that emulates the replacements of hardware.

2. More diversity of the function modules and the functions of the function module group owing to the programmable characteristic of the programmable logic gate device (e.g., a FPGA).

3. Accommodate to various hardware interfaces of the function modules and diverse functions using a variable hardware architecture provided by the programmable logic gate device with a unique advantage of modifying functions easily.

4. The memory unit is capable of storing large amounts of configuration data, so as to provide various different types of control modes, such as the signal line switching mode, the function module selecting mode, the function module replacement mode, the function module deletion mode, the function module expansion mode, and the function module group expansion mode. Control modes can be updated or replaced by simply updating the configuration data stored in the memory unit.

5. Function modules or function module groups can be arbitrarily selected, replaced, deleted or expanded. Buses of the function modules and arbitrary pins of corresponding (correspondingly connected) external signal lines can also be arbitrary switched, dynamically modified or adaptably adjusted, such that the present disclosure is not constrained by fixed pins of the external signal lines.

The above embodiments are used only to illustrate the principles of the present disclosure and its effect, rather than to limit the present disclosure. The above embodiments can be modified by one of ordinary skill in the art without departing from the spirit and scope of the present disclosure. Therefore, the scope claimed of the present disclosure should be defined by the following claims.

What is claimed is:

1. A variable electronic apparatus, comprising:
   a memory unit configured for storing a configuration data;
   a processing unit configured for reading the configuration data from the memory unit and determining at least one control mode based on the configuration data; and
   a single programmable logic gate device including a plurality of function modules and at least one switching unit,
   wherein the control mode determined by the processing unit includes a function module replacement mode, and the processing unit is configured to replace at least one of the function modules of the single programmable logic gate device with a new function module established by the configuration data from the memory unit or replace at least one of the function modules of the single programmable logic gate device with another one of the function modules based on the function module replacement mode.

2. The variable electronic apparatus of claim 1, wherein the control mode includes a function module selecting mode and a signal line switching mode, and the processing unit is configured to select or activate at least one of the function modules of the single programmable logic gate device based on the function module selecting mode.

3. The variable electronic apparatus of claim 2, wherein the switching unit of the single programmable logic gate device is configured to dynamically modify or adaptably adjust a bus of the function module selected by the processing unit and an external signal line corresponding to the function module selected by the processing unit based on the signal line switching mode.

4. The variable electronic apparatus of claim 3, wherein the single programmable logic gate device is a field-programmable gate array (FPGA), a complex programmable logic device (CPLD), a programmable logic device (PLD) or a generic array logic (GAL).

5. The variable electronic apparatus of claim 3, wherein the function module is a module of an inter-integrated circuit (I2C), a serial peripheral interface (SPI), an enhanced serial peripheral interface (eSPI), a low pin count (LPC) bus, a system management bus (SMBus), a peripheral component interconnect express (PCI-e) bus, a universal asynchronous receiver/transmitter (UART), a controller area network (CANbus), an advanced extensible interface (AXI), an advanced peripheral bus (APB), an advanced high-performance bus (AHB), or a universal serial bus (USB).

6. The variable electronic apparatus of claim 3, wherein the configuration data stored in the memory unit is updated, and the processing unit is configured to read the updated configuration data from the memory unit and provide an updated control mode.

7. The variable electronic apparatus of claim 3, wherein the switching unit of the single programmable logic gate device is further configured to dynamically modify or adaptably adjust pins of a signal line and an external signal line corresponding to the function module selected by the processing unit based on the signal line switching mode.

8. The variable electronic apparatus of claim 7, wherein the external signal line is used for an external device to be connected thereto.

9. The variable electronic apparatus of claim 3, wherein the control mode includes a function module deletion mode, and the processing unit is configured to delete at least one of the function modules based on the function module deletion mode.

10. A variable electronic apparatus, comprising:
a memory unit configured for storing a configuration data;
a processing unit configured for reading the configuration data from the memory unit and determining at least one control mode based on the configuration data; and
a single programmable logic gate device including a plurality of function modules and at least one switching unit,
wherein the control mode determined by the processing unit includes a function module expansion mode, and the processing unit is configured to add at least one new function module established by the configuration data from the memory unit into the single programmable logic gate device based on the function module expansion mode to expand a number of function modules in the single programmable logic gate device.

11. A variable electronic apparatus, comprising:
a memory unit configured for storing a configuration data;
a processing unit configured for reading the configuration data from the memory unit and determining at least one control mode based on the configuration data; and
a single programmable logic gate device including a plurality of function modules and at least one switching unit,
wherein at least one of the function modules and the at least one switching unit of the single programmable logic gate device constitute a function module group, the control mode determined by the processing unit includes a function module group expansion mode, and the processing unit is configured to add at least one new function module group established by the configuration data into the single programmable logic gate device based on the function module group expansion mode to expand a number of function module groups in the single programmable logic gate device.

* * * * *